United States Patent [19]
Schweizer

[11] 3,721,324
[45] March 20, 1973

[54] REVERSIBLE CLUTCH MECHANISM
[75] Inventor: Edward E. Schweizer, New Rochelle, N.Y.
[73] Assignee: Transi-Coil Corporation, Hasbrouck Heights, N.J.
[22] Filed: Dec. 1, 1971
[21] Appl. No.: 203,553

[52] U.S. Cl. ............192/48.91, 192/46, 192/48.92, 192/71
[51] Int. Cl. ....................F16d 11/06, F16d 21/02
[58] Field of Search............192/48.91, 48.92, 46, 71

[56] References Cited

UNITED STATES PATENTS

| | | | |
|---|---|---|---|
| 283,459 | 8/1883 | Bapple | 192/71 X |
| 2,182,385 | 12/1939 | Neracher et al. | 192/71 X |

FOREIGN PATENTS OR APPLICATIONS

| | | | |
|---|---|---|---|
| 67,647 | 12/1928 | Sweden | 192/71 |

*Primary Examiner*—Allan D. Hermann
*Attorney*—Mark T. Basseches et al.

[57] ABSTRACT

An improved reversible clutch mechanism of the type in which one or the other of two drive mechanisms is coupled to drive shaft selectively, in accordance with the direction of rotation of the shaft. The clutch includes a pair of annular shells independently rotatably mounted on the drive shaft and at least one pawl disposed in the space provided between the shells.

The pawl includes first and second drive teeth which are offset in the direction of the axis of the shaft so that one said tooth is in proximity to one shell and the other in proximity to the other shell.

A cross pin mounted on the shaft is pivotally connected to the pawl, to shift the pawl radially in one or another direction, depending upon the direction of rotation of the shaft, thereby to couple one or the other of the teeth of the pawl to one or the other of the shells.

8 Claims, 4 Drawing Figures

INVENTOR.
EDWARD E. SCHWEIZER
BY Mark Daneches
ATTORNEY

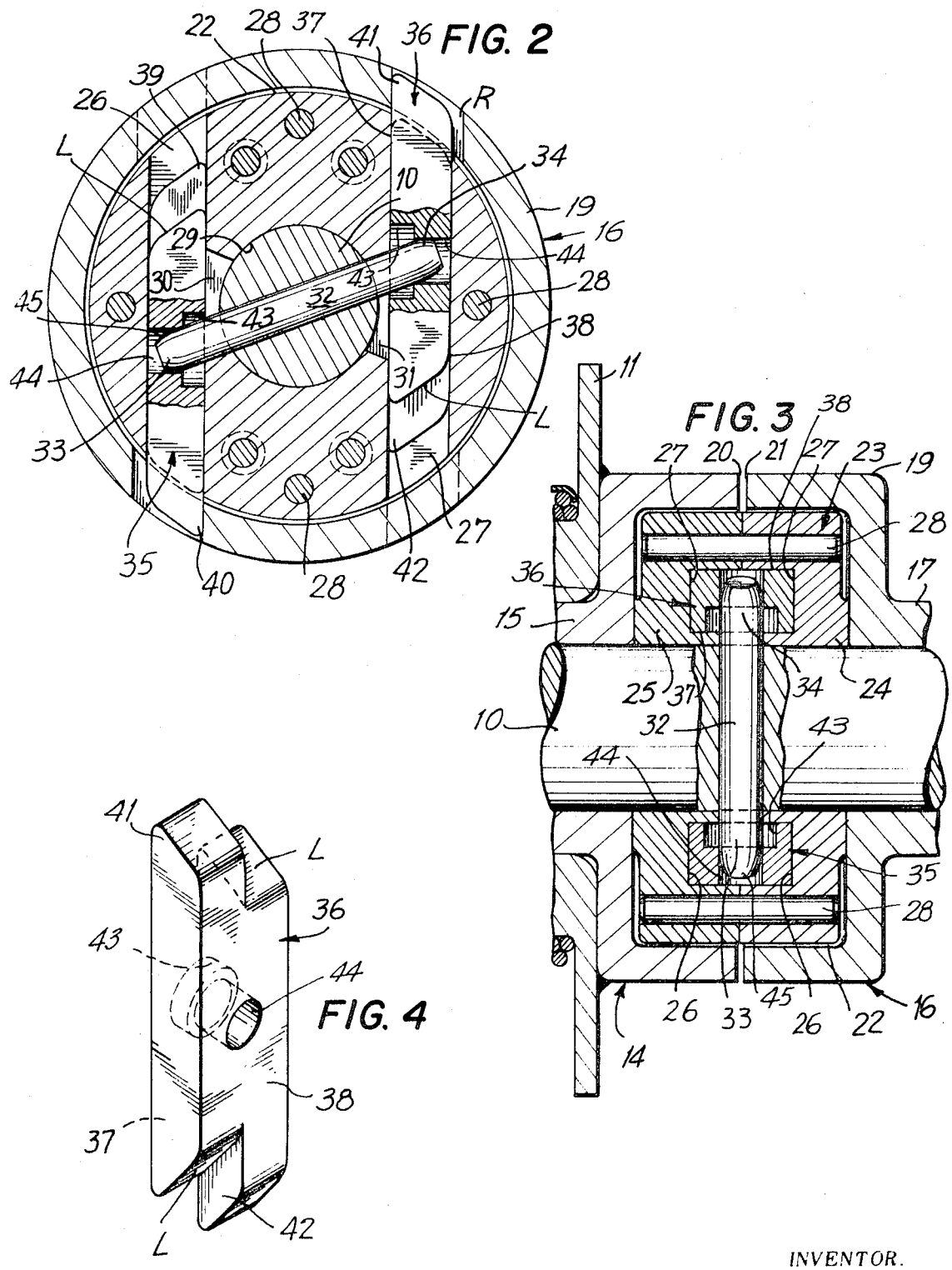

REVERSIBLE CLUTCH MECHANISM

BACKGROUND OF THE INVENTION

1. Field of the Invention

This invention is in the field of reversible clutch mechanisms and more particularly to a clutch mechanism which selectively and automatically engages a drive shaft into driving connection with one or the other of two members rotatably mounted on the shaft in accordance with the direction of rotation imparted to the shaft.

2. The Prior Art

Various types of clutches are known which function to connect the drive shaft with one or the other of a pair of drive mechanisms rotatably mounted on the shaft. Preferably the unconnected mechanism is permitted to free wheel or freely rotate relative to the shaft.

Reversing clutch mechanisms heretofore known have many drawbacks which interfere with their efficient operation or long life. In some instances, such mechanism requires a shifting of the clutch parts in the direction of the axis of the drive shaft. Such devices involve lubrication and wear problems, requiring frequent maintenance, and often become jammed. In the event of jamming, reverse rotation of the shaft does not effect the desired decoupling of one driven member and coupling of the other driven member.

Certain reversing clutches heretofore known have employed multiple gear teeth in combination with a shifting drive mechanism wherein transmission of driving forces is preceded by a meshing of the teeth of the driving and driven members. Frequently torque is transmitted prior to full meshing of the teeth, with resultant damage to the torque transmitting parts.

In other clutch assemblies of this type, the free wheeling member is controlled by a slip ratchet arrangement which, as is well known, is undesirable due to the high noise factor and the susceptibility of such ratchet drive to shearing or wear.

SUMMARY OF THE INVENTION

The present invention may be summarized as directed to an automatic reversing clutch mechanism which overcomes the problems inhering in prior known mechanisms of this type. The mechanism includes a drive shaft and a pair of annular drive shells independently rotatably mounted on the drive shaft, each of the shells being coupled to one of the two output mechanisms to be driven. The shells are disposed in proximate spaced relation along the shaft, to define therebetween an annular chamber.

There is preferably mounted in such space or chamber a coupling disk, slidably carrying one or more pawl members which may be shifted in a plane which is preferably normal to the axis of the drive shaft.

The drive shaft includes a drive pin pivotally connected to the pawl, so that the initial rotary movements imparted to the shaft shift the pawl in one direction if the shaft is rotated one way, and in the opposite direction on counter-rotation of the shaft.

The pawl or pawls are provided with first and second teeth, which teeth are offset from each other in the direction of the axis of the drive shaft.

The shells incorporate drive recesses adapted to receive one or the other of the teeth of the pawl, depending upon the direction in which the pawl is moved. The length of the pawl is such that one or the other, but not both, of the teeth will be engaged with one of the shells, the unengaged shell being thus in free wheeling relation to the shaft.

Accordingly, it is an object of the invention to provide an improved automatic reversing clutch of the type in which one or the other of two members mounted for rotation on a drive shaft is selectively coupled to the shaft in accordance with the direction of rotation thereof.

A further object of the invention is the provision of a device of the class described wherein the uncoupled shell is in free wheeling relation to the shaft.

Still a further object of the invention is the provision of a device of the class described wherein coupling and uncoupling is effected without the necessity of movement of parts longitudinally with respect to the drive shaft axis.

Still a further object of the invention is the provision of a device of the class described which is simple in construction, does not require the use of springs or like element shifting parts, the power or forces relied upon to effect engagement of the driving and driven members resulting solely from torque forces derived from the shaft.

Still a further object of the invention is the provision of a reversing clutch of the type described wherein coupling and uncoupling is effected by a pawl member moving in a plane transverse to the axis of the shaft, the pawl preferably including means for automatically locating the drive tooth components thereof in a fixed desired relation with respect to the driven component.

To attain these objects and such further objects as may appear herein or be hereinafter pointed out, reference is made to the accompanying drawings forming a part hereof, in which:

FIG. 2 is a vertical section taken on the line 2—2 of FIG. 1.

FIG. 3 is a horizontal section taken on the line 3—3 of FIG. 1.

FIG. 4 is a perspective view of one of the two operating pawls.

Figure 1:
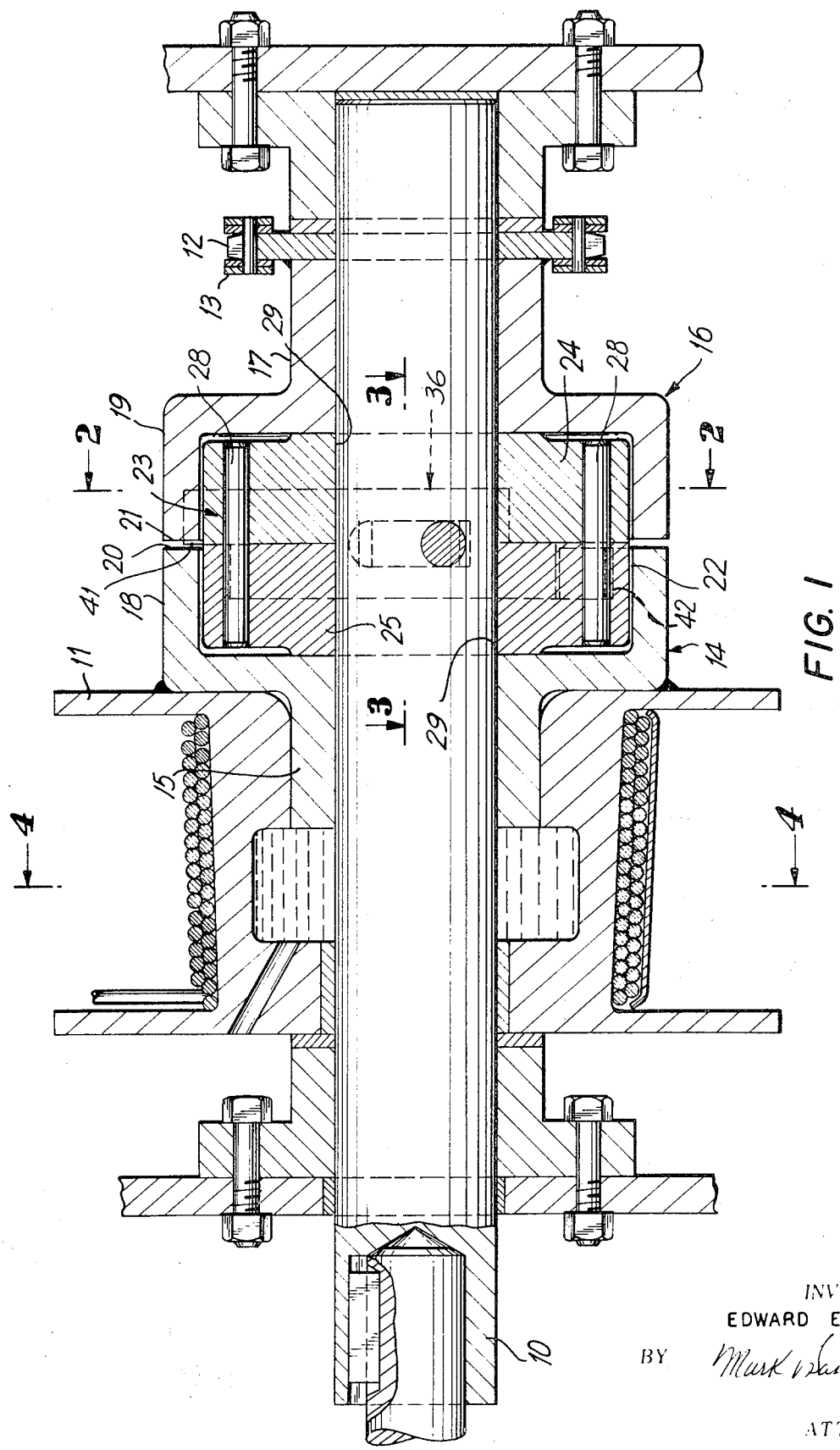
FIG. 1 is a horizontal sectional view of a clutch assembly of the type described.

Referring now to the drawings, 10 is a drive shaft extension portion of the clutch. 11 is a cable drum mechanism forming one of the two alternatively driven power take-off mechanisms. The other power take off mechanism is, by way of illustration, a sprocket 12 in driving relation to a chain 13.

The take up drum 11 is fixed, as by welding, to a shell member 14 having a sleeve portion 15 rotatably mounted on the shaft 10. Sprocket 12, in similar fashion, is welded to a second shell member 16, the sleeve portion 17 of which is likewise rotatably mounted on the shaft 10.

As will be understood from the ensuing description, the shells 14, 16 form the power take off outputs, one or the other of the shells being coupled to the shaft 10, the decoupled shell being free to rotate relative to the shaft. Upon reverse rotation of the shaft 10, the formerly decoupled shell will be connected in torque transmittion relation with the shaft, the first mentioned shell being freely rotatable thereon.

While the clutch of the present invention is shown in conjunction with an elongated shaft 10 carrying the drum 11 and sprocket 12, it is to be understood that these specific driven mechanisms are illustrative only, the clutch mechanism being suitable for a multiplicity of applications.

As will be appreciated from an inspection of FIGS. 1 and 2, the shells 14 and 16, in addition to the bearing sleeve portions 15 and 17, include annular rim members 18 and 19, the rim members having their mouth portions 20, 21 in proximate spaced relation, the rims thus conjointly defining an annular chamber 22 surrounding the shaft 10.

Received within the chamber 22 is a clutch disk member 23 which, in the present embodiment, is formed of separate disk halves 24, 25. The disk halves, as best seen in FIG. 2, include parallel slots or channels 26, 27, the portion of the slot or channel of each disk half 24, 25 being aligned with the channel portion of the other half. It will thus be observed that the channels 26, 27 are formed partially in each disk half. The disks are secured together by a series of longitudinally extending connector members, such as pins 28.

Each of the disks includes a central circular aperture 29 surrounding the shaft 10, the disks being recessed as at 30, 31 (FIG. 2) in areas registering with the channels 26, 27, respectively.

The shaft 10 carries a cross or transfer pin 32, the distal ends 33, 34 of which project through the segments 30, 31 and into the channels 26, 27, respectively.

It will be seen that, as thus far described, the shaft and pin are free to rotate relative to the clutch disk assembly 23 through an angular distance limited by the angular extent of the segments 30, 31.

The channels 26 and 27 carry drive pawls 35, 36, which pawls are reciprocably slidably mounted within the channels. The pawls include parallel guide faces 37, 38 which intimately engage the parallel walls defining the channels to permit the desired reciprocal movement of the pawls.

The pawl 35 includes drive teeth 39, 40, which teeth are laterally offset from each other, as best seen in FIG. 1, whereby one of the drive teeth 40 is aligned with the rim portion 19 of drive shell 16, the other drive tooth 39 being aligned with the rim 18 of drive shell 14. In similar manner, pawl 36 includes offset drive teeth 41 and 42. Drive tooth 42 is aligned with rim 18, whereas drive tooth 41 is aligned with rim 19.

The pawls 35, 36, at central portions, are provided with pin receiver sockets including an enlarged recess portion 43 of a diameter to provide clearance for pivotal movement of the pin, and narrowed pin engagement aperture 44 providing a driving connection with the ends 33 and 34 of the pin. The ends 33, 34 of the pin are beveled or chamfered, as at 45, to permit an angular movement of the pin relative to the pawls.

The rims 18 and 19 are provided with drive apertures or recesses R in registry with the drive tooth portions 39, 40, 41, 42, respectively, of the pawls.

As may best be visualized from an inspection of FIG. 2, it will be observed that when an anti-clockwise torque is applied to the shaft 10, the parts will reach the orientation depicted in FIG. 2, wherein the pawl 35 is shifted downwardly and pawl 36 is shifted upwardly. In such orientation the pawl teeth 40 and 41 are both moved in the recesses R formed in the rim 19 of shell 16, whereby it will be appreciated that the shaft 10 is effectively torque-coupled to the rim 19.

Again with reference to FIG. 2, if a reverse torque were applied to the shaft 10, i.e., if the shaft were driven in a clockwise direction, it will be understood that the left hand pawl 35 would be moved upwardly within channel 26 whereas pawl 36 would be moved downwardly within channel 27. In such case, drive teeth 39 and 42, both of which are aligned with recesses in shell 18, would be shifted into such recesses, coupling the shaft 10 to the shell 18 and decoupling shell 19 from any driving connection to the shaft.

As will be apparent from an inspection of FIG. 4, the pawls 35, 36 are formed with stepped stop ledge portions L which, in the assembled position, are aligned with solid or nonrecessed portions of the inner circumference of the arms 18 and 19.

From the foregoing it will be evident that there is provided a reversing clutch mechanism wherein one or another of two shell members 14, 16 rotatably mounted on the drive shaft are selectively coupled in torque transmitting relation to the shaft automatically in accordance with the direction of rotation of the shaft.

It will be further understood that the uncoupled shell will be free of any torque transmitting connection to the shaft so long as the shaft is idle or is continued to be driven in a given direction. Upon reversing of the direction of rotation of the shaft, the previously coupled shell will be decoupled, and vice versa.

It will be further appreciated that the coupling and uncoupling, contrary to many prior art devices (for example, see Carlo Re. U.S. Pat. No. 25,422 and Lyman U.S. Pat. No. 3451,463), does not involve any longitudinal movement of the clutch parts, i.e., any movement along the shaft axis.

The device of the present invention is extremely simple to manufacture, and is compact, durable and troublefree, and accordingly is suitable for heavy duty usage.

Having thus described the invention and illustrated its use, what is claimed as new and is desired to be secured by Letters Patent is:

1. An improved reversing clutch comprising a drive shaft, first and second drive shells independently rotatably mounted on said shaft, said shells including annular rim portions coaxial with and surrounding said shaft, said rims being longitudinally spaced on said shaft and together defining an annular clutch chamber, drive recesses in each said shell communicating with said chamber, activator pin means keyed to said shaft, first and second pawl members mounted for movement in said chamber toward and away from said recesses, pivot connection means linking each end of said pin with one of said pawls, said first pawl being shifted into said drive recess of said first shell and said second pawl being withdrawn from the drive recess of said second shell by said pin in response to rotation of said shaft in one direction, said second pawl being shifted into said drive recess of said second shell and said first pawl withdrawn from said first shell recess by said pin responsive to rotation of said shaft in the other direction.

2. A clutch in accordance with claim 1 and including a clutch disk assembly rotatably mounted on said shaft within said chamber, said pawls being slidably mounted within said disk assembly.

3. A clutch in accordance with claim 2 wherein said disk assembly includes first and second slot portions formed therein for guiding said pawls.

4. A clutch assembly in accordance with claim 2 wherein the periphery of said disk assembly is disposed in proximate spaced relation to the inner surface of said annular rims, said pawls including drive portions adapted to enter said drive recesses, and stop portions adjacent said drive portions, said stop portions engaging said inner surface thus to radially locate said drive portions relative to said recesses.

5. A clutch assembly in accordance with claim 2 wherein said pawls include a projecting drive tooth portion at each end, said drive tooth portions of each pawl being laterally offset from each other.

6. The clutch assembly of claim 5 wherein each said pawl includes a locator stop portion adjacent each said tooth portion, each said stop portion, in the extended position of said tooth portions, bearing against a portion of the inner surface of one of said rims.

7. The clutch mechanism of claim 1 wherein said pawls each includes a projecting drive tooth portion at each end, the drive tooth portions of each pawl being laterally offset from one another and being aligned with a different one of said rims, a drive tooth portion of both of said pawls being coupled with the same rim responsive to rotation of said shaft in either direction.

8. A reversing clutch comprising a drive shaft, a pair of shells rotatably mounted on said shaft, said shells having rims defining an annular chamber, each said rim including a pair of drive recesses, a clutch disk rotatably mounted on said shaft in said annular chamber and including a pair of parallel guide channels, each end of each said guide channel being in registry with a drive recess formed in a different one of said rims, a drive pawl slidably mounted in each said guide channel for movement between limiting positions, said drive pawls including a drive tooth at each end shiftable into one or the other of the recesses in registry with said channel in accordance with the position of said pawl, an activator pin on said shaft and operably connected to said pawls for shifting both said pawls between limiting positions in said channels responsive to relative rotation of said shaft and said disk whereby said pawls are both coupled to the recesses of one or the other said shells in accordance with the direction of rotation of said shaft.

* * * * *